Patented Jan. 2, 1951

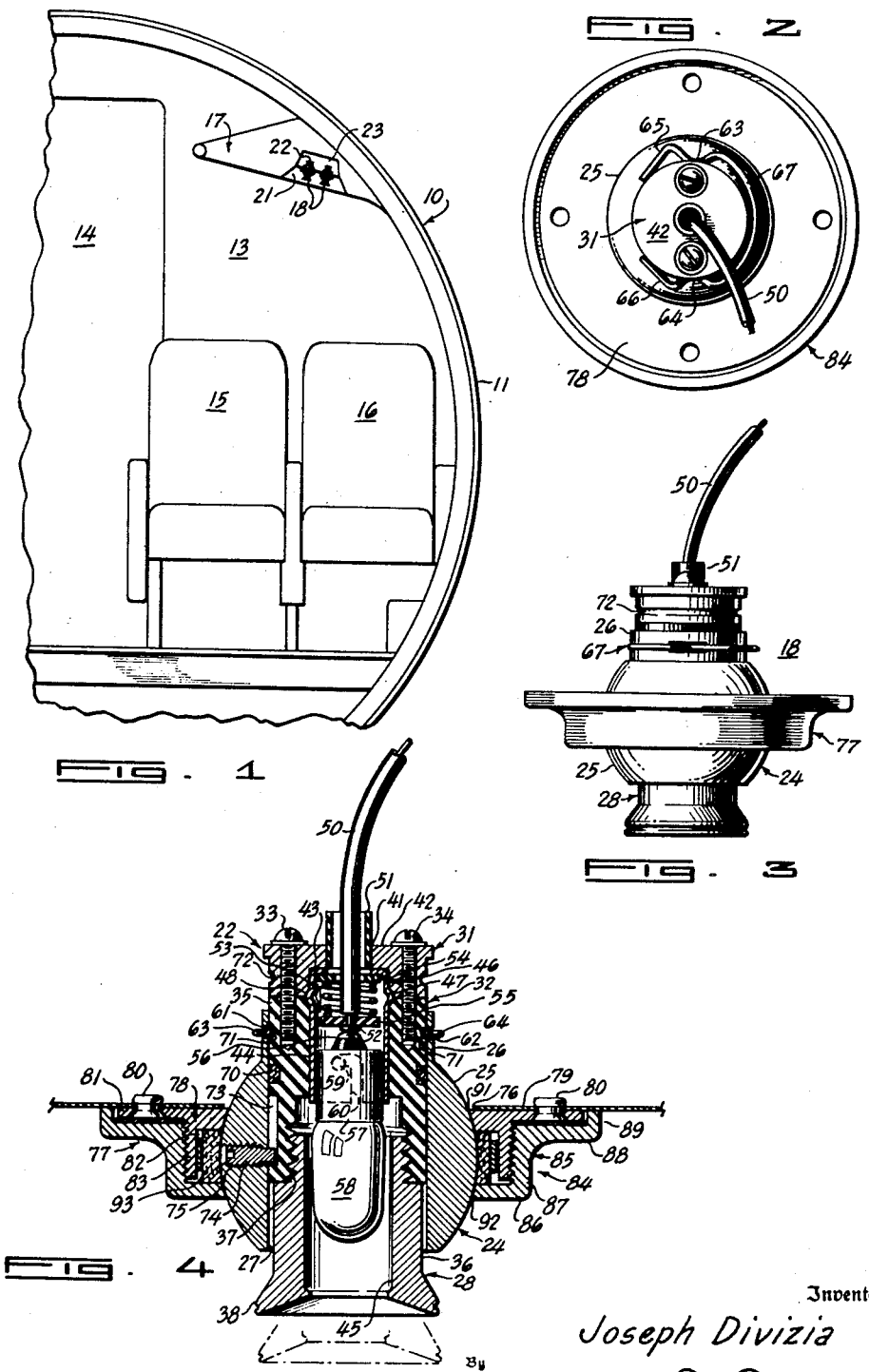

2,536,799

UNITED STATES PATENT OFFICE 2,536,799

SLIDABLY MOUNTED LAMP ACTUATOR AND HOUSING

Joseph Divizia, Alhambra, Calif., assignor to Consolidated Vultee Aircraft Corporation, San Diego, Calif., a corporation of Delaware Application February 26, 1948, Serial No. 11,162

5 Claims. (Cl. 240—7.35)

This invention relates to lighting apparatus and more particularly to a lighting device that is directionally controllable.

An object of the present invention is to provide an improved form of lighting device having a novel construction which permits ready directional control of the light rays emanating therefrom.

Another object of the invention resides in the provision of an improved, readily operated and directionally controllable lighting device which is particularly adapted for use in a vehicle where the lighting requirements of the individual passengers occupying that vehicle may differ, and where it is desirable that the lighting means for satisfying his particular needs be placed under the direct control of the individual.

A still further object of the invention lies in providing an improved lighting device having a simple and economical construction and which is efficient in operation.

Other objects and features of the present invention will be readily apparent to those skilled in the art from the following specification and appended drawings wherein is illustrated a preferred form of the invention, and in which:

Figure 1 is a diagrammatic transverse section of a passenger cabin of an aircraft employing lighting devices embodying the present invention;

Figure 2 is a top plan view of the lighting device;

Figure 3 is an elevational view of the lighting device; and

Figure 4 is a vertical sectional view, enlarged, of a lighting device according to the present invention.

In the drawings the present invention is shown illustrated in use in a vehicle which, merely for the sake of illustration, is here understood to be an aircraft. Having reference now particularly to Figure 1 there is shown a portion of an aircraft cabin passenger compartment indicated generally by the numeral 10 and shown here as comprising an arcuate wall 11, although it is understood that the particular wall shape has no bearing on the invention. Forming the rear wall of the cabin compartment 10 is a bulkhead 13 having a centrally located doorway 14 provided therein for ingress to this compartment. Located in the passenger compartment 10 is a plurality of seats arranged transversely of the cabin and in longitudinal rows, with the rows consisting of pairs of seats, the individual seats in a pair being indicated generally at 15 and 16, and with each pair of seats being located to one side of a central aisle which is in line with the doorway 14. Extending over the seats 15 and 16 is a shelf-like member 17 which may serve for stowage of minor baggage and which also serves to mount the lighting devices 18 of the present invention in desired positions.

As shown the lighting devices 18 are arranged in pairs and lie disposed in a recess 21 provided in shelf-like member 17. The interior end 22 of each lighting device 18 extends into a longitudinally extending trough or ventilating passage 23 which runs the length of the cabin. The air passing through the trough 23 serves to cool the lighting device 18, as will be more fully discussed hereinafter. The source of ventilating air and the connection therefrom to the trough 23 are not shown as their particular construction or arrangement form no part of the invention.

The lighting device 18, as best illustrated in Figures 2, 3 and 4, comprises a main body portion or housing 24, which housing 24 embodies a substantially spherical or ball portion 25 having integral therewith and extending therefrom a cylindrical or collar-like portion 26. Extending axially through the housing 24 is a continuous bore or passage 27.

Mounted for axial movement within bore 27 and extending the full length thereof and projecting at both of its ends, beyond the housing 24, as shown in the drawings, is an elongated lamp supporting and actuating member 28. The actuating member 28 includes, as components thereof, a metallic cylindrical member 31, a tubular member 32, formed of insulating material, disposed adjacent member 31, in axial alignment therewith and secured thereto by a pair of studs 33 and 34, which studs extend through openings provided in member 31 and are threaded into the upper end of the defining wall 35 of member 32; and a metallic tubular member 36 which is secured to the lower end of insulating member 32, the engagement between these two members being effected by appropriate cooperating threads 37 provided on the members. The tubular member 36 at its lower end is provided with an outwardly flared portion 38 which lies disposed exteriorly of the housing 24 and is adapted to be grasped readily to effect rectilinear or longitudinal movement of actuating member 28 within bore 27 and to swing or rotate housing 24 on its mounting for a purpose to be described.

The upper cylindrical member 31 has an opening 41 provided in its outer face 42, which opening leads to a recess 43, which is of greater diameter than opening 41. Opening into recess 43 is a bore 44 provided in insulating member 32; this latter bore 44 further connects, at its lower end, to a bore 45 provided by the lower tubular member 36. Through this described system of bores and openings a continuous passage is effected through actuating member 28.

Fitted into recess 43 of cylindrical member 31 and extending therefrom into bore 44 of insulating member 32 is a socket element 46. A peripheral ridge 47, pressed out of the circular walls of the socket 43, is adapted to be received within an internal circular groove 48 defined and formed by the wall surfaces of upper member 31 and insulating member 32 at the point at which they abut. With the ridge 47 disposed in the circular groove 48 and member 31 secured to insulating member 32 by the studs 33 and 34 it is readily apparent that the socket 46 will be securely held in place.

A cable 50 extends first through an insulating collar 51 closely fitted in opening 41 in upper member 31 and then through an aligned opening in socket 46 to a position within the socket and terminates in a contact 52. A compression spring 53 is disposed within socket 36, having one end resting on a first insulating washer 54 and the opposite end against a second insulating washer 55, which bears against contact 52, whereby the compression spring 53 exerts its bias to yieldably urge the contact 52 into engagement with a lamp contact 56 provided in the base 57 of an incandescent lamp 58. Pins 59 carried by lamp base 57 are adapted to fit into bayonet slots 60 formed in socket 46 to secure the lamp 58 to the socket.

Formed in the collar-like portion 26 of housing 24 are two openings 61 and 62, diametrically located. These openings are provided to receive projections 63 and 64 formed on the legs 65 and 66 of a generally U-shaped contact element 67. The contact element 67 is formed of a resilient metal, such as spring steel, whereby the legs 65 and 66 are always biased toward one another. Projections 63 and 64, provided by these legs, normally will be forced into their respective co-operating openings 61 and 62 under the inherent resiliency of legs 65 and 66 to securely mount the contact element 67 upon collar 26. The projections 63 and 64 extending through openings 61 and 62 are adapted to locate, selectively, within a pair of spaced peripheral grooves 71 and 72. Groove 71 is formed in the exterior surface of insulating member 32 and cooperates with projections 63 and 64 to releasably maintain the actuating member 28 in its upper position, as shown in Figure 4, which is Light Off position. Groove 72 formed in the exterior surface of metallic member 31 is also adapted to receive the yieldable projections 63 and 64 which occurs when actuating member 28 is manually moved to the dotted line position of Figure 4, which is Light On position. When the projections 63 and 64 engage metallic member 31 the socket 46 is grounded through the skin or wall of the airplane by way of the metallic member 31, projections 63 and 64 of contact member 67, and housing 24. With the grounding of socket 46 the lighting circuit is completed so that lamp 58 will light and the light rays therefrom will pass through bore 45 to the exterior of the lighting device 18.

A sealing ring 70 formed of any suitable material, such as felt, is fitted within a peripheral groove formed in the exterior wall of insulating member 32 to prevent the leakage of air past actuating member 28 and so cause an unpleasant whistling noise.

Located substantially midway of actuating member 28 and formed in insulating member 32 is a recess 73 into which extends the end of a stop screw 74, the remainder of which is movably disposed in a threaded bore 75 provided in ball portion 25 of housing 24. This screw end is adapted to engage with the vertically spaced upper and lower defining wall surfaces of recess 73, on telescoping movement of the actuating member 28 within main housing bore 27, to limit the amount of inward and outward movement that may be provided actuating member 28.

As indicated in the drawings, the housing 24 of the lighting device 18 extends into and through an annular aperture 76 provided in the base 79 of the air trough 23. To mount housing 24 in position there is provided a socket member 77. The socket member 77 comprises an annular mounting member 78 having an out-turned flange 81 which is riveted, as by rivets 80, or otherwise rigidly secured, to the base 79 of trough 23. The mounting member 78 is recessed as at 82 to provide an annular wall portion 83, which wall portion is exteriorly threaded to mount a cap element 84. The cap element 84 comprises a generally cup-shaped portion 85 having a base 86, annular walls 87, an outwardly extending peripheral flange 88, and an upwardly bent flange 89. Cap element 84, as seen from the drawings, when threaded onto mounting member 78 completely encloses the latter to effect a lighting unit having a particularly clean appearance.

The mounting member 78 is provided with an annular opening 91 in its base into which the ball portion 25 of housing 24 extends. A second annular opening 92 is provided in base 86 of cap element 84 and in alignment with opening 91. The wall surfaces defining the openings 91 and 92 are of generally arcuate conformation to conform to the exterior surface of ball portion 25, and cooperate to provide a seat for this ball portion whereby the housing 24 is mounted for universal movement to provide for effective directional control of the light rays emitting from the lighting device 18. Thus the support effected by socket member 77 permits the housing 24 to be pivotally or swingingly moved and to be rotated about its longitudinal axis as desired.

A felt seal 93 is disposed in recess 82 of mounting member 78 and encircles the ball portion 25 of housing 24, substantially about its central portion, and serves to prevent leakage of air therearound and into the cabin compartment.

To operate the lighting unit 18 a passenger need only grasp the outer flared end 38 of actuating or light operating member 28 and pull it downwardly and outwardly from its housing 24. This will cause projections 63 and 64 of contact member 67 to be forced out of groove 71 in the insulating member 32 and to snap into groove 72 in metallic member 31, as this groove aligns with openings 61 and 62, to complete the electrical circuit and cause lamp 58 to light. The housing 24 may then be swung in its socket 77 to a position wherein the light rays from lighting device 18 will fall upon a desired location.

One lighting device 18 is associated with each seat and is adapted to efficiently service that seat. Providing each seat with a lighting unit 18 enables each passenger to service primarily his own particular seating area and with a minimum of interference with the lighting requirements and desires of the passenger in the adjoining seat.

It has been found that the air in the trough 23 in passing by the inner end 22 of the lighting unit 18 will carry away sufficient of the heat developed by lamp 58 to enable a passenger to freely handle the actuating member 28 without burning his hand. Further the construction of lighting device 18 is such that leakage of air therethrough is substantially completely eliminated so that no objectionable air noises are created.

An advantage of the present invention when utilized in a vehicle lies in the fact that the stewardess or attendant can immediately determine by a glance which of the various lighting units in the cabin have been left on by a passenger after the airplane has discharged its passengers, for only those devices are on which have the actuating member thereof in extended position. The attendant may then push those particular actuating members 28, which are extended, into their respective housings and prepare such units for use by succeeding occupants.

With the construction described the replacement of a burned out lamp is a relatively simple matter. With the actuating member 28 extended the lower member 36 is unscrewed from its engagement with insulating member 32. This will expose the lamp and permit it to be grasped and removed and a replacement inserted.

While certain preferred embodiments of the invention have been specifically disclosed, it is understood that the invention is not limited thereto as many variations will be readily apparent to those skilled in the art and the invention is to be given its broadest possible interpretation within the terms of the following claims.

I claim:

1. A lamp supporting and operating structure comprising a body portion having an axially extending bore therethrough, means for supporting said body portion for pivotal movement, an electric circuit controlling device slidably mounted within said bore and adapted to be moved longitudinally therein, said electric circuit controlling device comprising a tubular member open at its ends, a generally cylindrical insulating member secured at one end to said tubular member and a metallic generally cylindrical member secured to the opposite end of the insulating member, said insulating member having an axial bore therethrough in communication with an opening in said metallic generally cylindrical member and with the passage through said tubular member, an electrical socket carried within said insulating member and seated against said metallic cylindrical member and adapted to hold a lamp so that light rays therefrom will issue from the tubular member to the exterior through its open end, contact means carried by said body portion adapted to be engaged by said metallic cylindrical member on longitudinal movement of said electric circuit controlling device relative to the body portion to complete an electric circuit to said electrical socket, and means on said tubular member for effecting said longitudinal movement of said electric circuit controlling device and for pivotally moving said body portion on its supporting means for directing the light rays issuing through the open end of said tubular member.

2. A lamp supporting and operating structure comprising a body portion having a bore extending therethrough, an electric circuit controlling device slidably mounted within said bore and adapted to be moved longitudinally therein, said electric circuit controlling device comprising a tubular member open at its ends, a generally cylindrical insulating member secured at one end of said tubular member and a metallic generally cylindrical member secured to the opposite end of the insulating member, said insulating member having an axial bore therethrough in communication with an opening in said metallic generally cylindrical member and with the passage through said tubular member, an electrical socket carried within said insulating member and seated against said metallic cylindrical member and adapted to hold a lamp so that light rays therefrom will issue from the tubular member to the exterior through its open end, and a resilient contact element supported by said body portion to be positioned exteriorly of said electric circuit controlling device and adapted to extend through said body portion normally to engage said insulating member, and adapted to be engaged by said metallic cylindrical member on longitudinally movement of said electric circuit controlling device relative to the body portion to complete an electric circuit to said electrical socket.

3. A lamp supporting and operating structure comprising a body portion having a bore extending therethrough, an electric circuit controlling device slidably mounted for axial movement within said bore, said electric circuit controlling device comprising a tubular member open at its ends, a generally cylindrical insulating member secured at one end to said tubular member and a metallic generally cylindrical member secured to the opposite end of the insulating member, said insulating member having a bore therethrough in communication with an opening in said metallic generally cylindrical member and with the passage through said tubular member, mounting means positioned within said insulating member for holding a lamp whereby light rays are adapted to issue from the tubular member through its open end, said mounting means being arranged for electrical connection to said metallic cylindrical member, and a generally U-shaped contact element supported by said body portion to be positioned exteriorly of said electric circuit controlling device, said U-shaped contact element comprising a pair of resilient arms, said resilient arms having portions thereof adapted to extend through openings in said body portion normally to engage said insulating member, said portions adapted to be engaged by said metallic cylindrical member on axial movement of said electric circuit controlling device relative to the body portion to complete an electric circuit to said lamp mounting means.

4. A lamp supporting and operating structure comprising a body portion having a bore extending therethrough, said body portion embodying a substantially spherical portion from which extends a collar portion, supporting means providing a seat for said substantially spherical portion for mounting it for universal movement, an electric circuit controlling device slidably mounted within said bore and adapted to be moved axially therein, said electric circuit controlling device comprising a tubular member open at its ends, a generally cylindrical insulating member secured at one end to said tubular member and a metallic generally cylindrical member secured to the opposite end of the insulating member, said insulating member having an axial bore therethrough in communication with an opening in said metallic generally cylindrical member and with the passage through said tubular member, an electrical socket carried within said insulating member electrically connected to said metallic cylindrical member and adapted to hold a lamp so that light rays therefrom will issue from the tubular member to the exterior through its open end, and a generally U-shaped contact element supported by said collar on said body portion and comprising a pair of resilient arms, said arms having portions thereof adapted to extend through openings in the collar normally to engage said insulating member and adapted to be engaged by said metallic cylindrical member on axial movement of said electric circuit controlling device relative to the body portion to complete an electric circuit to said electrical socket, and means on said tubular member for effecting said axial movement of said electric circuit controlling device and for moving said body portion on its supporting means for directing the light rays issuing through the open end of said tubular member.

5. A lamp supporting and operating structure comprising a body portion having an axially extending bore therethrough, said body portion embodying a substantially spherical portion from which extends a collar portion, means providing a seat for said substantially spherical portion for mounting it for universal movement, an electric circuit controlling device slidably mounted within said bore and adapted to be moved longitudinally therein, said electric circuit controlling device comprising a tubular member open at its ends, a generally cylindrical insulating member secured at one end to said tubular member and a metallic generally cylindrical member secured to the opposite end of the insulating member, said insulating member having an axial bore therethrough in communication with an opening in said metallic generally cylindrical member and with the passage through said tubular member, an electrical socket carried within said insulating member and seated against said metallic cylindrical member and adapted to hold a lamp so that light rays therefrom will issue from the tubular member to the exterior through its open end, and a generally U-shaped resilient contact element supported by said collar of said body portion to be positioned exteriorly of said electric circuit controlling device, said U-shaped contact element comprising a pair of resilient arms, said arms having portions thereof adapted to extend through openings in said collar normally to lie within a peripheral groove in said insulating member, and adapted to be disposed in a second peripheral groove provided in said metallic cylindrical member on longitudinal movement of said electric circuit controlling device relative to the body portion to complete an electric circuit to said electrical socket, said tubular member having a portion thereof disposed exteriorly of said body portion adapted to effect longitudinal movement of said electric circuit controlling device and for pivotally moving said body portion on its supporting means for directing the light rays issuing through the open end of said tubular member.

JOSEPH DIVIZIA.

REFERENCES CITED

The following references are of record in the file of this patent:

UNITED STATES PATENTS

| Number | Name | Date |
|---|---|---|
| 845,236 | Hewlett et al. | Feb. 26, 1907 |
| 1,118,699 | Stupar | Nov. 24, 1914 |
| 1,169,099 | Wilcox et al. | Jan. 18, 1916 |
| 1,417,925 | Kuen | May 30, 1922 |
| 1,479,520 | Terbeck | Jan. 1, 1924 |
| 1,615,067 | Boerman | Jan. 18, 1927 |
| 1,672,605 | Dobrick | June 5, 1928 |
| 1,687,877 | Moorhouse | Oct. 16, 1928 |
| 1,762,509 | Edmonds | June 10, 1930 |
| 1,778,186 | Douglas | Oct. 14, 1930 |
| 2,260,588 | Smith | Oct. 28, 1941 |